Figure 1:
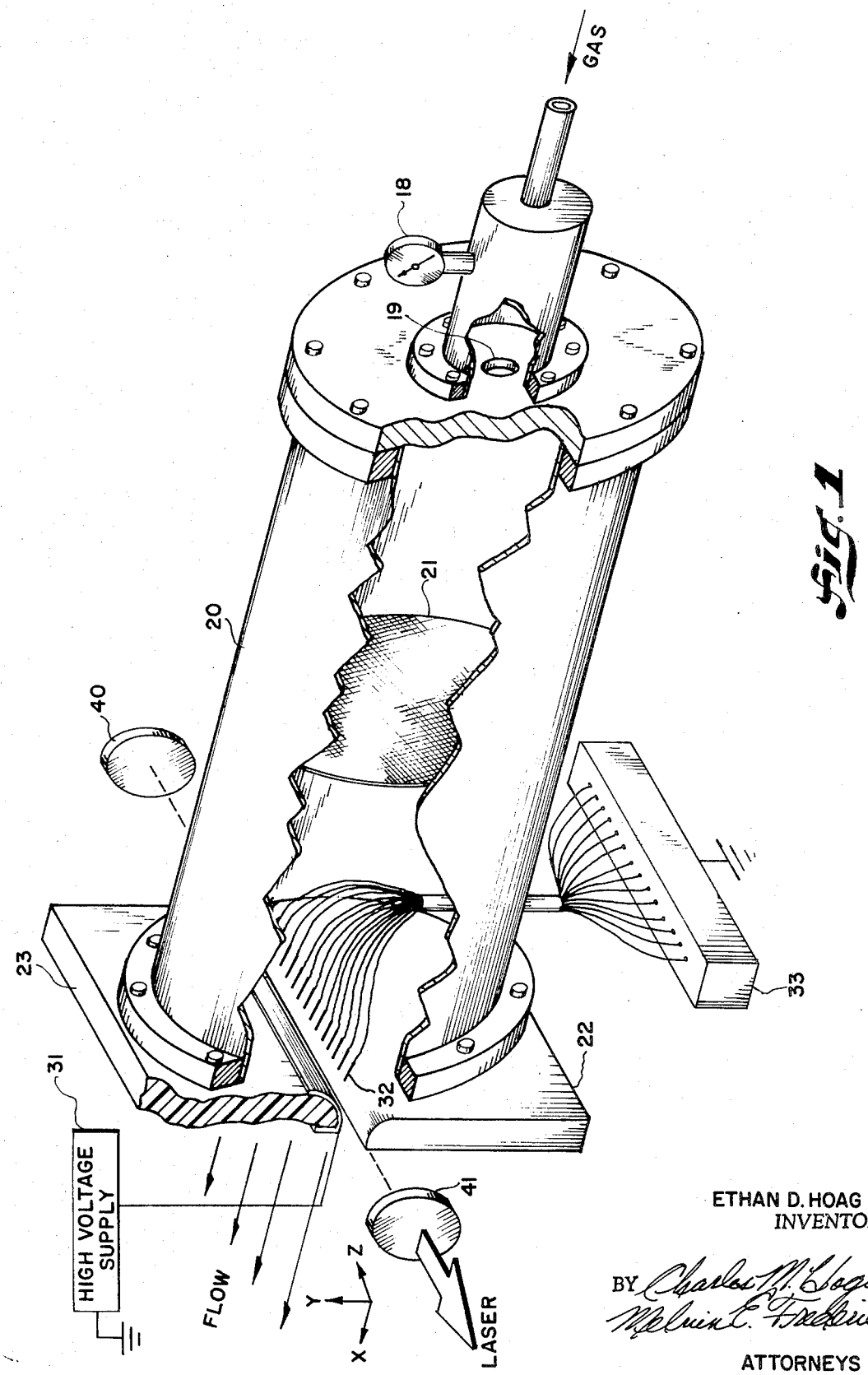

United States Patent [19]

Hoag

[11] 3,758,874
[45] Sept. 11, 1973

[54] CORONA DISCHARGE LASER
[75] Inventor: Ethan D. Hoag, Boston, Mass.
[73] Assignee: Avco Corporation, Cincinnati, Ohio
[22] Filed: Sept. 17, 1971
[21] Appl. No.: 181,432

[52] U.S. Cl. ............... 331/94.5, 204/176, 204/313, 313/309, 313/351
[51] Int. Cl. ............................................. H01s 3/00
[58] Field of Search ........................... 313/309, 351; 331/94.5 D, 94.5 P, 94.5 E, 94.5 C, 94.5 G; 204/176, 313

[56] References Cited
UNITED STATES PATENTS

| | | | |
|---|---|---|---|
| 3,577,096 | 5/1971 | Bridges et al. | 331/94.5 |
| 3,666,982 | 5/1972 | Wiegard | 331/94.5 |
| 109,601 | 9/1870 | Dunderdale | 204/313 |
| 3,543,179 | 11/1970 | Wilson | 331/94.5 G |

OTHER PUBLICATIONS

"Powerful New Gas Laser", Canadian Electronics Engineering, Feb. 1970, pp. 51 and 52.

"Transversely Excited Atmospheric Pressure Carbon Dioxide Lasers" Applied Physics Letters, Vol. 16, No. 12, pp. 504 and 505, June 15, 1970.

Hill "Uniform Electrical Excitation of LARGE Volume High Pressure Gases With Application to Laser Technology". AIAA 9th Aerospace Sciences Meeting N.Y., N.Y. Jan. 1971 Rec'd. Aug. 10, 1971.

Primary Examiner—Ronald L. Wibert
Attorney—Charles M. Hogan et al.

[57] ABSTRACT

A method of and apparatus for producing laser action in and transverse to a flowing gas over a wide range of flow and pressure conditions by an electrical discharge orthogonal to both the flow and lasing direction which is stabilized by electrode segmentation and ballasting.

1 Claim, 2 Drawing Figures

ETHAN D. HOAG
INVENTOR.

ATTORNEYS

CORONA DISCHARGE LASER

INTRODUCTION

The present invention relates to methods of and apparatus for the generation and amplification of light waves and more particularly to the generation and amplification of such waves by means of devices including flowing gaseous media in which stimulated emission of radiation is provided by electrical means to create free electrons and maintain the optimum electron environment to produce lasing action, by establishing a stable discharge at high pressures which is made possible by using a segmented ballasted electrode.

Light amplification by stimulated emission of radiation (laser) has extended the range of controlled electromagnetic radiation to the infrared and visible light spectrum. A laser produces a beam of coherent electromagnetic radiation having a particular well-defined frequency in that region of the spectrum broadly described as optical. This range includes the near ultraviolet, the visible and the infrared. The coherence of the beam is particularly important because it is that property which distinguishes laser radiation from ordinary optical beams. On account of its coherence, a laser beam has remarkable properties which set it apart from ordinary light which is incoherent. While the maser (microwave amplification by stimulated emission of radiation) and the laser are based on the same principle of statistical and quantum mechanics, the problems and the physical embodiments for achieving laser action are completely different from those for masers.

Coherence, the essential property of lasers is of two kinds: spatial and temperal. A wave is spatially coherent over a time interval if there exists a surface over which the phase of the wave is the same (or is correlated) at all points. A wave is time-coherent at an infinitesimal area on a receiving surface if there exists a periodic relationship between its amplitude at any one instant and its amplitude at later instants of time. Perfect time coherence is an ideal since it implies perfect monochromaticity, something which is forbidden by the uncertainty principle.

Laser beams have a number of remarkable properties. Because of their spatial coherence, they have an extremely small divergence and are, therefore, highly directional. For example, a ruby laser beam one inch in diameter at the source will be about four feet across on a surface ten miles away. The very best that could be accomplished over the same distance with an incoherent source, such as an arc lamp at the focus of a six-foot parabolic mirror, would be a beam spread over an area more than one-third of a mile across. Another important feature of lasers is the enormous power that can be generated in a very narrow wave length range. Under certain operating conditions, monochromatic bursts of millions of watts can be produced. To get comparable radiation intensity from a black body, it would have to be raised to a temperature of hundreds of millions of degrees—a condition not practically achievable. A laser beam, because it possesses space coherence can be focused to form a spot whose diameter is of the order of one wave length of the laser light itself. Enormous power densities are thus attainable. For example, the focused output of a 50 kilowatt infrared burst from a laser can have a radiant power density of the order of $10^{12}$ watts/cm$^2$; this is about 100 million times the power density at the surface of the sun. Extraordinarily high temperatures, orders of magnitude greater than that at the sun, can be generated at the small area which absorbs this concentrated radiation. Furthermore, since the electric field strength of an electromagnetic wave is proportional to the square root of its intensity, the field at the focus of the laser beam can be millions of volts per centimeter. The most promising potential of lasers comes from time coherence. It is this property which permitted prior art exploitation of radio and microwave for communications. However, laser frequencies are millions of times higher than radio frequencies, and hence, are capable of carrying up to millions of times more information. In fact, one single laser beam has in principle more informationcarrying capacity than all the combined radio and microwave frequencies in use at the present time.

Accordingly, systems applications of lasers are useful for communication in space, on earth, and under the sea. Military surveillance, weapons systems, mapping, medical and computor technology may also include lasers.

Two conditions must be fulfilled in order to bring about laser action: (1) population inversion must be achieved, and (2) an avalanche process of photon amplification must be established in a suitable cavity, such as; for example, an optical cavity. Population inversion can be accomplished if (1) the atomic system has at least three levels (one ground and at least two excited levels) which can be involved in the absorption and emission processes, and (2) the spontaneous emission lifetime of one of the excited states is much longer than that of the other or others.

When a system is in a condition where light (photon) amplification is possible, laser action can be achieved by providing (1) means for stimulating photon emission from the long-lived state, and (2) means for causing photon amplification to build up to extremely high values. In the usual embodiment, this is accomplished by fashioning the medium containing the active atoms into a cylinder with perfectly (as far as possible) parallel ends polished so highly that the end surface roughness is measured in terms of small fractions of a wave length of light. The ends are silvered or dielectric coated to behave as mirrors which reflect photons coming toward them from the interior of the cylinder. Such a structure, whether the mirrors are within or outside the container, is called an optical cavity. If now pumping means, such for example; an intense source, acts on the medium and brings about population inversion of the long-lived state with respect to another lower energy excited state even though the long-lived state is only relatively long-lived, in a small fraction of a second there will be spontaneous emission of photons. Most of these photons will be lost to the medium, but some of them will travel perpendicular to the ends and be reflected back and forth many times by the mirrors. As these photons traverse the active medium, they stimulate emission of photons from all atoms in the long-lived state which they encounter. In this way the degree of light amplification in the medium increases extraordinarily and because the photons produced by stimulated emission have the same direction and phase as those which stimulate them, the electromagnetic radiation field inside the cylinder or cavity is coherent. In order to extract a useful beam of this coherent light from the cavity, one (or both) of the mirrors is made slightly transmissive. A portion of the highly intense beam leaks through the mirror, and emerges with plane-parallel, regularly spaced wavefronts. This is the laser beam.

Parallelism of the mirrors is a rigorous geometrical requirement. If the mirrors are not precisely parallel, the light rays that build up in the cavity will tend to digress further and further toward the edges of the mirrors as they are reflected back and forth between the mirrors, and finally they will be directed out of the cavity altoghter. It is essential that any deviation from parallelism be so small that the coherent photon streams will reflect back and forth a very large number of times to build up the required intensity for laser action. In a conventional well-made laser cavity, the angle that one mirror makes with the other (called wedge angle) is about two seconds of arc. Satisfactory wedge angles may be achieved, for example, with micrometer adjustments. Use of spherical mirrors eases somewhat the rigorous requirements for keeping the still-amplifying beam in the cavity because spherical surfaces of the proper radius tend to reflect off-axis beams toward the center of the cavity. The laser radiation which emerges from a spherical mirror has spherical wave fronts and thus is divergent. However, since such coherent wave fronts appear to originate from a common center, they can be by use of a lens made plane-parallel and hence, except for diffraction effects, non-divergent.

By way of example, a continuously operating gas laser is disclosed in an article, "Population Inversion and Continuous Optical Maser Oscillation in a Gas Discharge Containing He-Ne Mixture," Physical Review Letter, 6, page 106, 1961. In the usual embodiment of static gas, prior art gas lasers, the gas is statically contained in a tube about 100 centimeters long. The mirrors which form the ends of the optical cavity are disposed either inside the tube or external to it. Pumping is accomplished in this system by electrical excitation (either radio frequency or direct current).

In addition to the helium-neon gas laser system, other gas laser systems have been achieved with helium, neon, argon, krypton, xenon, and cesium (the last optically pumped in the gaseous state) as emitting atoms.

Other systems include carbon dioxide, helium, and nitrogen. For a more complete discussion of the high-power flowing system including carbon dioxide, helium, and nitrogen reference is made to patent application of C.K.N. Patel, Ser. No. 495,844, filed Oct. 14, 1965, and now abandoned and assigned to Bell Telephone Laboratories, Inc. Such a high-power laser typically includes two reflectors forming a suitable resonator or cavity; a tube forming the sidewalls of the laser; suitable pumping apparatus including a cathode, anode, and direct-current sources connected in appropriate polarity between the anode and the cathode; inlet apparatus; a source of carbon dioxide, helium, and nitrogen connected to the inlet apparatus; and equipment for exhausting the spent gases from the laser or for cooling and separating them for reuse.

As indicated hereinabove, a laser output may be generated in various media (i.e. crystals, semiconductors, and gases) by pumping or introducing energy to create an inversion where a large number of the atoms are in high energy levels to support photon emission. In prior art gas lasers whether flowing or static, the lasers were pumped or excited by using a diffusion controlled electrical discharge in a small tube maintained at low pressure. Typically, in such gas discharge tubes (typically of the order of one centimeter in diameter) operating at low pressures (about 1–10 torr) there is a loss of electron-ion pairs from the center of the plasma to the sidewalls of the tube by radial diffusion (so-called ambipolar diffusion of ion-electron pairs). For a steady state operation of the discharge, this loss must be made up by a net ionization rate in the plasma which exactly balances the diffusion loss rate. This required ionization rate dictates what temperature the electrons must have to sustain the discharge, and hence, what applied E/N is needed to give the electrons that temperature. For long tubes E/N is defined by the applied voltage divided by the tube length and gas density.

In such situations the discharge can be said to be "ballasted" by the tube walls, i.e. since radial diffusion of the electron-ion pairs is fast, any small local increase in electron density is reduced by diffusion. This fact makes such discharges stable and axially uniform as well as quite reliable and simple to produce.

The plasma (neutral gas plus electron-ion pairs) contained inside the electric discharge tube tends to remain radially stable as long as the time required for the electron-ion pairs to diffuse to the surrounding walls is comparable to the ionization time such as, for example, the time required to double the electron density. Since the ambipolar diffusion time is generally proportional to the product of the gas pressure and the tube diameter squared for large diameters, this ambipolar diffusion time can, under some circumstances, become long compared to the ionization time in the tube, especially for high ionization rates, large diameter tubes and high pressures. In this latter situation, the discharge is no longer "ballasted" by the presence of the tube walls, i.e. local increases in the electron density are not immediately diffused to the walls where they are reduced by wall recombination, etc. Accordingly, local non-uniformities can be produced by these higher electron densities and the fast-growing non-uniformities can become worse. Often the result is that the previously uniform glow discharge turns into arcs, streamers, or current spokes. This latter condition often is a plasma that is very inefficient, and often useless for certain purposes.

From the above it will be seen that in high-pressure, large diameter discharge tubes the tendency is for any local increase in electron density not to be damped by diffusion to the confining walls. Upon occurrence of such disturbances one can reduce their tendency to grow by reducing the ionization rate which means a lower electron temperature since the local ionization rate is a function of the local electron temperature. A lower electron temperature, however, requires that a lower electric field must be applied. The proper balance is a critical one; if too high an electric field is applied, the discharge cannot be started in the first place. Further, an applied voltage or electric field large enough to start a discharge may also be large enough to cause the discharge to be radially non-uniform and, for example, "spoke."

The present invention is directed to the production of and apparatus for providing spatially uniform useful discharges in flowing gas lasers at pressure levels and sizes such that electron-ion pair diffusion to the confining walls is negligible, that is, the discharge is not wall dominated and is a true volume discharge.

In its preferred embodiment, the present invention comprises a flowing gas laser which is truly volumetric in character and that can be scaled in all three-characteristic dimensions as well as in pressure level. A spatially uniform discharge is created where electron-ion diffusion to the walls is truly negligible.

While the preferred embodiment of the present invention will be described in connection with a flowing electrically excited nitrogen ($N_2$), carbon dioxide ($CO_2$), and helium (He) laser, it may be applied to other systems where such a plasma is required, including; but not restricted to, gas constituents other than nitrogen, carbon dioxide, and helium as well as other lasing systems. A discharge in accordance with the invention has the correct electron temperature for most efficient laser operation. Moreover, a laser in accordance with the invention is volumetric in the sense that the proper gas temperature and lower laser state concentrations are maintained not by diffusion through the gas to cooled side walls, but rather by the proper choice of gas flow velocity.

It is an object of the present invention to provide apparatus for and a method of producing a population inversion suitable for use in a gas laser oscillator or amplifier.

It is another object of the present invention to provide apparatus for and a method of producing laser action in a flowing gas by electrical excitation.

A still further object of the present invention is to provide a method of and apparatus for producing laser action in a flowing gas by electrical excitation comprising a DC discharge to maintain the optimum electron environment to produce a laser action.

A still further object of the invention is to provide an electrically excited flowing gas laser wherein the arrangement of the electrical excitation means result in optimum optical properties.

A still further object of the present invention is to provide a method in an apparatus for producing laser action in a flowing gas at high pressures by segmenting and ballasting the electrodes.

Another object of the present invention is to provide adequate ballasting in a flowing gas electrically excited laser to maintain a corona discharge, and to alleviate unstable behavior.

One of the difficulties in a flowing gas laser in which an electrical discharge is used to render the working gas capable of lasing is that a discharge in a gas stream tends to be unstable, due primarily to gas dynamic effects. It should be noted that this problem is not limited to flowing gas lasers. However, for example, arc discharges, heaters, plasma generators, and ozone generators are three other types of devices in which discharges across gas streams occur. In these applications, also, instabilities in the discharge may be a problem. It is, therefore, a further object of this invention to provide a means for establishing and maintaining a stable discharge across a stream of gas.

Figure 2:
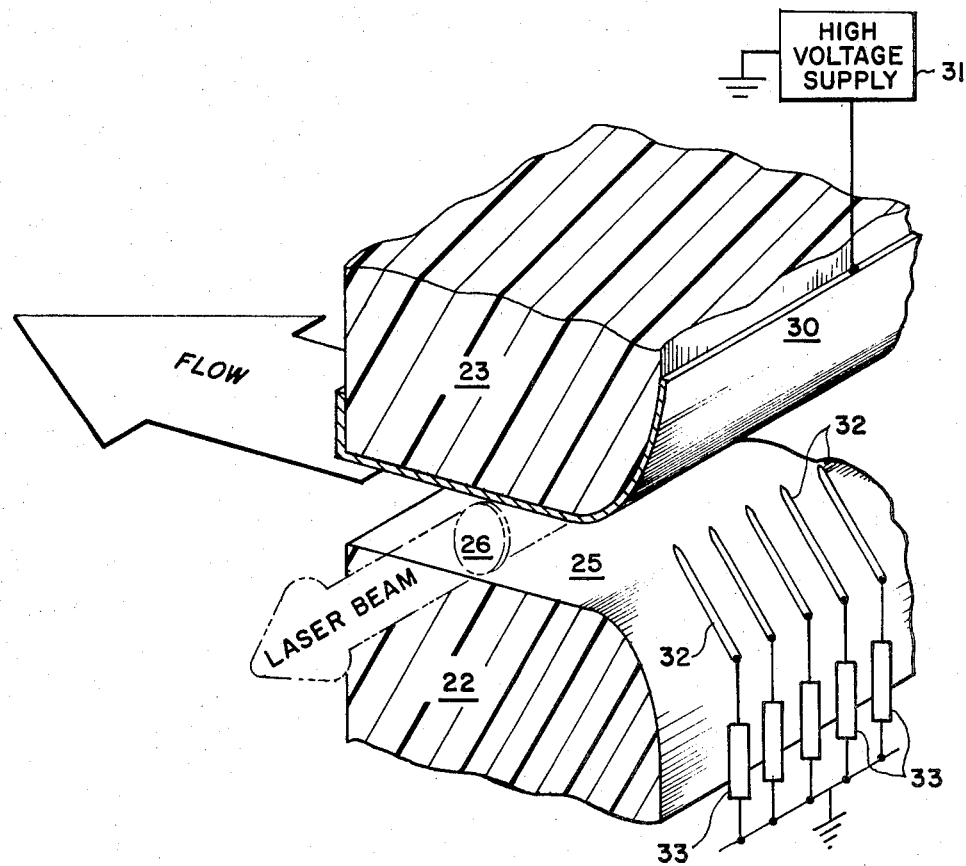

For a better understanding of the invention, together with other and further objects, advantages and capabilities thereof, will best be understood from the following description of a specific embodiment when read in conjunction with the accompanying drawings, in which:

FIG. 1 is a perspective view of an embodiment of the invention partially broken away showing portions of the laser device in detail; and FIG. 2 is an expanded perspective view of a detailed embodiment of the invention showing a portion of the electrode configuration and working cavity.

The specification now proceeds to the description of the preferred forms of the laser and method in accordance with the invention. Attention is, therefore, directed to FIGS. 1 and 2.

Gas is supplied from a source (not shown) through a metering system comprising a pressure gage 18 and sonic orifice 19. This metering system controls the amount of gas flow introduced during the operation of the laser. The gas used in the invention may consist of any gas or mixture of gases which will support laser action such as CO, $H_2O$, $SO_2$, HCN, $H_2$, Ar, $NO_2$, $N_2O$, HF, He, $N_2$, $CO_2$, and the like. By way of example, the gas used in the preferred embodiment comprised a mixture of carbon dioxide, nitrogen, helium (3:77:20 by volume percentage). The gas enters a plenum chamber 20 after passing through orifice 19. The pressure in the plenum chamber 20 is maintained slightly above one atmosphere in order to insure flow out of the system to ambient. The plenum chamber is composed of a pressure sealed container with orifice 19 at one end to allow the entrance of the gas and a rectangular slot at the other end which is appropriately contoured to provide a subsonic nozzle 25 and test section 26 which is the working region of the laser. Approximately midway in the chamber 20 is placed a flow smoothing screen 21 which assists in removing eddies and turbulence in the flow and thereby providing a uniform flow of gas through the working region 26. The working region 26 may be formed by spacing rectangular shaped pieces of non-conducting material 22 and 23 sealably and removably attached to the end of the chamber 20 remote from orifice 19.

As the gas passes through the working region 26 the medium is electrically excited thus creating a population inversion and subsequent laser action. This excitation may be accomplished both in a pulsed or continuous mode of operation. The continuous mode will be discussed in some detail and comments will be inserted where appropriate to indicate that which may be done to operate the device in a pulsed mode.

Attached to and covering the inner surface of member 23 as shown in FIG. 2, is an electrical conducting plate 30 which is used as an electrode. Plate 30 may be constructed of any suitable metallic conducting material such as aluminum, copper, or gold. The plate 30 is electrically connected to a power source 31 which provides the energy necessary to create an electrical discharge across the working region 26. Opposed to plate 30 adjacent to member 22 is positioned a number of wire electrodes, numerically designated 32, used to complete the electrical circuit through the working region 26. These electrodes may be constructed of any suitable metallic conductor, such as tungsten, carbon, or copper. A discussion of the configuration and design of these electrodes and ballasting means will be more fully discussed hereinafter. Approximately 120 of electrodes 32, evenly spaced one from another along the length of the working region, are used in the preferred embodiment each electrode 32 is individually electrically connected in series to ballasting means generally designated 33 and, thereby, ballasted. The ballasting means 33 is electrically connected to ground to complete the circuit. If a pulsed system is contemplated, each ballast resistor comprising ballasting means 33 may be replaced by either capacitors or coils. The electrode configuration and ballasting is of significant importance to the invention since the stability of the electric discharge is critically dependent upon many factors to be discussed immediately hereinafter.

All electric discharges of this type involve sources of ionization competing with various electron ion loss mechanisms. A discharge is said to be stable when the electron density is uniform over a scale size comparable to the discharge regions during the time period of interest. Local as used hereinafter means on a scale size which is small compared to the distance discussed. Instabilities occur when ion and electron production rates in local regions exceed the loss rates there with a resulting uncontrolled local increase in electron density and current flow. This is tantamount to the statement that energy is deposited locally in the gas more rapidly than it can be dissipated locally. When this happens, the local temperature must increase, giving rise to a local decrease in gas density. This in turn increases the local ionization rate since the ionization rate generally is a steeply increasing function of the ratio E/N where E is the electric field (e.g. volts/cm) and N is the gas particle density (particles/cm$^3$). As this process continues more and more current passes through less and less of the total discharge volume and is ultimately limited by factors external to the discharge. Such behavior is commonly referred to as spoking or arcing. These effects can occur either volumetrically within the gas where the main source of ionization is by means of electron-molecule collisions or at electrode surfaces where electrons are emitted from the surface by ion bombardment or where ions are emitted due to electron bombardment.

In essence, instability is due to an imbalance between two competing processes one of which, namely ion production, is a strong function of electron temperatures (which is a more or less unique function of E/N). Therefore, to stabilize the discharge there appears to be two broad options. One is to increase the local cooling rate to reduce local increases in E/N and the other is to somehow remove the strong dependence of the ionization upon E/N. This latter option is complicated by the fact that the magnitude of E/N required to pump the laser medium efficiently is not necessarily consistent with maintaining the proper balance between ion production and loss. Consequently, it would be very desirable to separate these two processes if possible.

With regard to the first option, increasing the local cooling rate, several possibilities exist.

1. Temporary Stability: Since the chief cause of instability is the local increase in E/N, due to local heating, discharges should tend to remain stable for periods short compared to the time required for sound to travel a distance comparable to the scale of potential instabilities. Spoke scale sizes are typically of the order of 1 mm diameter, and sound speeds are of the order of $3 \times 10^4$ cm/sec so that stability times are of the order of microseconds. Consequently, pulsed discharges should be inherently more stable than dc discharges. This effect is born out in pulsed discharges of the type described in an earlier U.S. Pat. No. 3,553,603.

2. Turbulent Diffusivity: Highly turbulent flows can enhance stability in a continuous discharge because local temperature fluctuations tend to become diffused by the turbulence. The overall bulk flow is not every effective for stabilization because the ionization tends to be carried along with the flowing gas, consequently, the offending density fluctuations have little relative velocity and are not dissipated.

3. Ambipolar Diffusion: This is by far the most common stabilization mechanism in use at present in electric gas lasers. The mechanism here is that ions and electrons diffusing to the walls of the container carry away translational energy thus tending to eliminate or reduce local increases in E/N. Unfortunately, it is limited to small devices since the ambipolar diffusion coefficient is inversely proportional to pressure and even at 1/10 atmosphere pressure, its magnitude is such that the characteristic apparatus size (e.g. the discharge tube diameter) is limited to dimensions of the order of 1 cm.

The second broad option namely removal of the E/N dependence of ionization is probably potentially the most promising since it attacks the root of the problem. Again several possibilities exist:

1. Ballasting: The E/N dependence of the ionization coefficient leads to negatively sloped V-I characteristics as viewed from the electrical terminals of the discharge. Ballasting is a loosely defined term referring to the insertion of electrical impedance in series with the discharge in order to give the overall V-I characteristic a positive slope or at least reduce its negative slope. This improves the stability because it has the effect of lowering the E/N as the current increases. The actual impedance used can take several forms. It can be an external element, resistive if direct current is involved or inductive or capacitive if AC or pulsed operation is involved. Alternately (or in addition), the cathode area can be arranged so that the discharge operates in the "abnormal glow" regeme as described in various treaties, such as "Gaseous Conductors" by Cobine. This has the effect of adding an external resistive element but tends to limit cathode life by sputtering away the cathode material. Ballasting is extensively used in conjunction with ambipolar diffusion for stabilizing small gas laser devices.

2. Temporal Separation: If the generation of free electrons (ionization) can be separated from the process of accelerating them to the proper velocity (or temperature) for efficiency laser operation then the stability problem is greatly alleviated. One way to achieve this is to use a high E/N to generate a sufficient quantity of electrons in a short time before an instability can develop then drop the E/N to a lower value suitable for pumping the laser, but too low to maintain the discharge. This technique has been described in copending patent application Ser. No. 50,993 dated June 29, 1970 and assigned to the same assignee as this application. This is inherently a pulsed operation, hence, cannot be used for cw.

3. Spatial Separation: As mentioned above in the discussion of stabilization by turbulent diffusivity, the bulk convection of a flow is not very effective in stabilizing a discharge because the local perturbations in E/N which trigger the instability are carried along with the gas, hence, these regions of excess heating and ion production have little relative velocity with respect to the discharge. If on the other hand, the major source of ionization is confined to a stationary point, as for example an electrode surface protruding onto the flow, then the convective cooling becomes more effective. Furthermore, if one takes advantage of the geometric electric field concentration which exists in the vicinity of a sharply pointed electrode, a small stationary local region can be created which is effectively cooled by the flow and where the E/N is high enough to create a substantial free electron-ion population. This ionization is then transported by the flow and by electric forces into another region where the E/N is appropriate for laser pumping. The process is similar to the temporal separation described above but is appropriate for DC operation.

The method used in the present invention to overcome the instability problem involves the use of three of the concepts described above, turbulent diffusivity, ballasting, and spatial separation. Each individual cathode pin protruding into the gas stream has a turbulent wake which helps stabilize its discharge. Each individual cathode is separately, ballasted with an external resistive element and in addition, is operated in the abnormal flow regeme. Each cathode is sharply pointed in order to provide a local region of high E/N to provide ionization which is then carried downstream and across the flow into a region of lower E/N where laser action takes place.

The size of the working region is limited by the distance over which the electron population produced at the cathode can be transported before it is lost by recombination, attachment, and ambipolar diffusion. At one atmosphere pressure this appears to be of the order of 1 cm. Higher pressures would probably decrease the distance, lower pressures should increase it.

The ratio of individual electrode spacing to anode-cathode spacing must range approximately between 1/10 and 10. Electrodes spaced too far apart do not take full advantage of the available gas flow, electrodes spaced too closely tend to break down from one to another thereby reducing the effective ballasting resistance locally (i.e. a spoke tends to form which collects current from several electrodes and carries it across to the opposing electrode in one concentrated region). The electric discharge formed in accordance with the teaching of this invention is a type of "corona" discharge. The corona or glow discharge is created by the high electric field in the vicinity of the electrodes operating in a high pressure environment.

The size and/or shape of the individual electrodes should be such that radii of curvature are created which are small compared to the spacing in order to provide the field concentration necessary to effect "spatial separation" as described above.

The flow speed should be such as to provide adequate heat removal both from the laser medium and from the ion production regions. That required in the laser region should be such as to limit the temperature to that for efficient laser operation. The actual temperature rise depends on the gases used. For the $He/N_2/CO_2$ system, it is of the order of 200°C. The flow required for the ion producing regions is that required to achieve stable operations. The upper limit on the flow velocity is dictated only by the gas pumping power required. Unless special circumstances warrant this probably limits the velocity to order Mach 1.0 or less.

Any gas mixture for which an inversion can be produced by electron excitation could conceivably be used in this device.

As previously described the flow of the gas is outward from the working region in the X direction, whereas the electrical discharge is transverse to such flow or in the Y direction. The excited region is contained within the space between the two electrodes. The laser action is extracted in the Z direction by a pair of mirrors which define the optical cavity. One of these mirror elements 40 is completely reflective and the other mirror element 41 is partially reflective and partially transmissant. The mirrors may be constructed of any material which is capable of reflecting the energy of the laser beam, such as copper. It will be understood that gas laser amplifies elements constituting a complete oscillator coupled to a feedback circuit. The optical feedback circuit element involved comprises mirrors 40 and 41 which is arranged to form a closed optical path or optical cavity of low loss into which the amplifying elements are effectively inserted. The mirrors 40 and 41 comprise one of many possible resonator structures. Operating parameters of laser apparatus which was tested incorporating the invention are set forth in Table I below:

TABLE I

| | |
|---|---|
| Output wavelength | $10.6\mu$ |
| Output coupling | 0.06% |
| Gas | 3% $CO_2$, 20% He, 77% $N_2$ |
| Pressure in discharge | 1 atmosphere |
| Mach No. | 0.08 |
| Total Current | 0.75 amps |
| Voltage | 4KV |
| Cavity flux (one way) | 375 watts/cm$^2$ |
| Laser Cavity size | 30 cm length |
| | 1 cm diameter |
| Ballast resistor | $0.3 \times 10^6$ ohms |

Electrical pumping by means of a gaseous discharge and providing an efficient source of light, is the principle herein employed and it may be implemented by many means, so that the invention is not limited to the specific pumping means herein shown.

While it has been shown what is presently considered to be the preferred embodiment of the invention, it will be understood by those skilled in the art that various changes and modifications may be made in the preferred apparatus and method without departing from the proper scope of the invention as claimed in the appended claims.

Having disclosed my invention, I claim:

1. In a laser apparatus, the combination comprising:
   a. gas supply means for producing subsonic flow of a lasable gaseous working medium having a predetermined velocity and pressure;
   b. first means defining an elongated working region having a longitudinal axis and which includes top and bottom non-conducting side walls, a portion of said side walls being contoured to provide an elongated entrance nozzle parallel to said longitudinal axis, said nozzle receiving said subsonic flow of gas in a direction normal to and extending along the length of said axis and through which said flow passes to said working region;
   c. second means including first and second electrode means for producing a continuous corona discharge disposed along said longitudinal axis and having direction normal to both the said flow direction and said axis of the working region for ionizing said gas to produce a population inversion in said gas during flow through said working region, said first and second electrode means being oppositely disposed adjacent to said nozzle and communicating with the interior of said working region, said first electrode comprising a solid conducting plate being contoured to the shape of said nozzle, said second electrode means comprising a plurality of electrically conducting wire-like projections extending into said gas flow in said working region, said projections being disposed along substantially the length of said logitudinal axis spaced one from another, said spacing being small as compared to the smallest dimension of said working region disposed along said longitudinal axis, the ends of said projections having a radii of curvature small compared to the spacing between said projections in order to achieve spatial separation and thereby assist in stabilizing said discharge, said projections extending a predetermined distance into the flow in order to achieve turbulent wake and thereby assist in further stabilizing said discharge;

d. third means comprising resistors in circuit with each projection to ballast and thereby further assist in stabilizing said discharge; and e. fourth means for exhausting said gaseous working medium to the atmosphere.

* * * * *